United States Patent [19]

Reagan

[11] 4,177,466
[45] Dec. 4, 1979

[54] AUTO THEFT DETECTION SYSTEM

[75] Inventor: William R. Reagan, Medfield, Mass.

[73] Assignee: Lo-Jack Corporation, Boston, Mass.

[21] Appl. No.: 851,835

[22] Filed: Nov. 16, 1977

[51] Int. Cl.² ............................................. G01S 11/00
[52] U.S. Cl. ............................... 343/112 TC; 340/63;
343/6.5 R; 343/112 R; 343/113 R
[58] Field of Search ........ 343/112 TC, 112 R, 113 R,
343/6.5 R, 6.5 LC; 340/15, 24, 63

[56] References Cited

U.S. PATENT DOCUMENTS

| | | | |
|---|---|---|---|
| 3,357,020 | 12/1967 | Slifer, Jr. ........................... | 343/15 X |
| 3,474,460 | 10/1969 | Huebscher ..................... | 343/6.5 LC |
| 3,568,161 | 3/1971 | Knickel ............................ | 340/24 X |
| 3,714,650 | 1/1973 | Fuller et al. ................... | 343/6.5 LC |
| 3,828,306 | 8/1974 | Angeloni ......................... | 340/24 X |
| 3,922,678 | 11/1975 | Frenkel ......................... | 343/112 TC |
| 4,021,807 | 5/1977 | Culpepper et al. ............. | 343/112 R |

*Primary Examiner*—Maynard R. Wilbur
*Assistant Examiner*—Richard E. Berger
*Attorney, Agent, or Firm*—Schiller & Pandiscio

[57] ABSTRACT

A system is disclosed for locating missing vehicles. Each vehicle broadcasts a locator signal when queried from a central station by an encoded call signal having a code characteristic of the vehicle. Indicators responsive to the locator signal are provided to determine the location of the missing vehicle.

21 Claims, 1 Drawing Figure

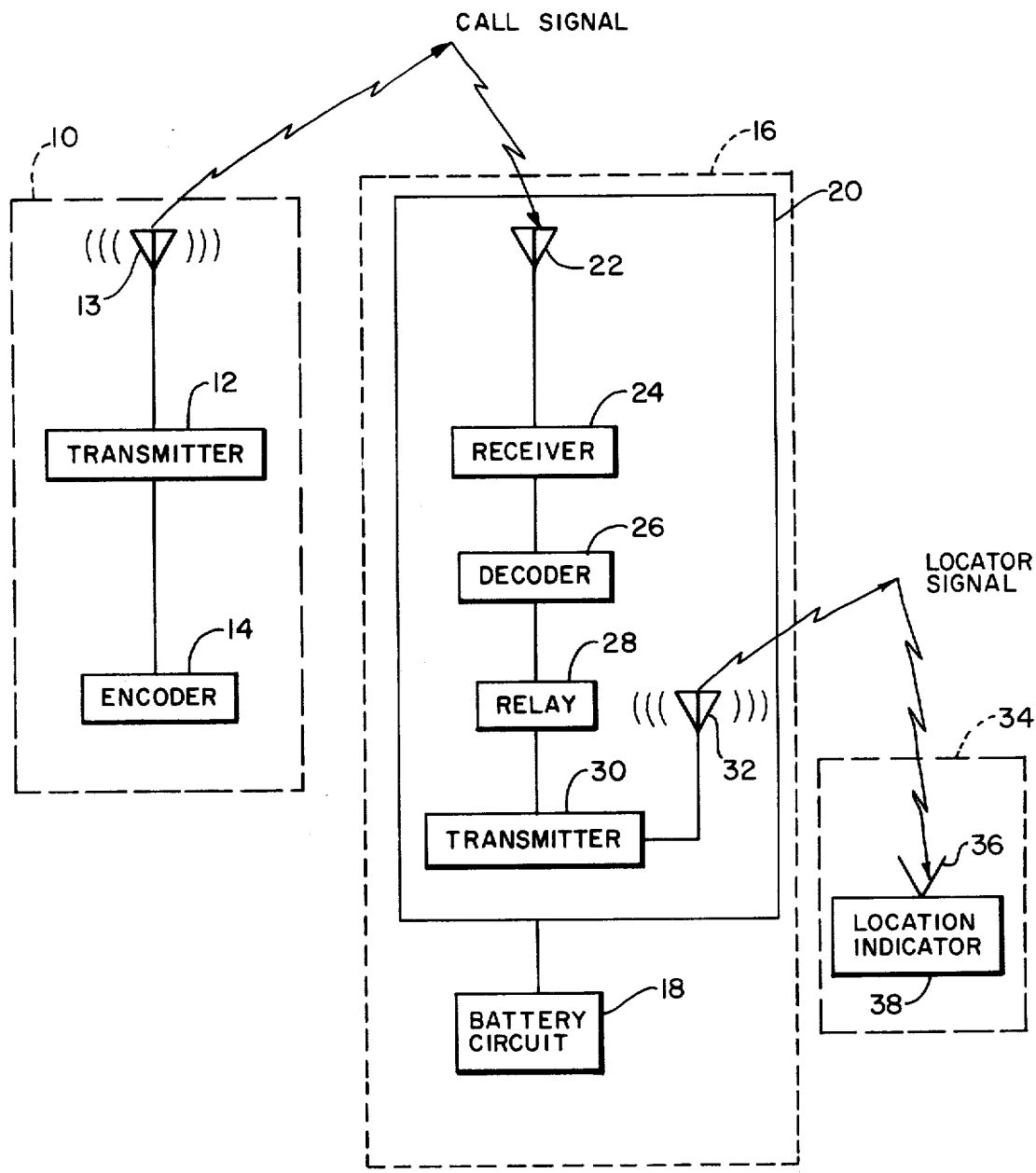

AUTO THEFT DETECTION SYSTEM

The present invention relates in general to a system for locating missing objects and in particular to a system for locating missing vehicles in a circumscribed geographic area.

In recent years the theft of mobile vehicles has assumed unprecedented proportions. This problem extends not only to passenger cars, but also to trucks carrying valuable cargo, pleasure craft and even airplanes. Various systems have been devised in an attempt to thwart such thefts and they have enjoyed only a limited degree of success. Most commonly, these systems have taken the form of alarm devices which are set off when an unauthorized person either enters or starts the vehicle. Such alarms normally receive their power from the vehicle's battery circuit and thus they can often be disabled before the theft occurs. Further, the alarm provides a signal for a limited time period only, as determined by the available battery power. If the alarm signal is not observed within that time period, it is ineffective to prevent the theft and it provides no clue thereafter for locating the stolen vehicle.

Other types of theft deterrent systems may perform a vehicle disabling function, such as shorting the ignition, or locking the steering column, etc. These systems have also encountered difficulties, not only because they can be disabled before the theft occurs, but because they present a danger to the legitimate driver of the vehicle who may have omitted to observe the prescribed procedure which avoids the occurrence of such a lock-out. Further, such systems are expensive to install and the installation must often be performed when the vehicle is manufactured.

OBJECTS OF THE INVENTION

It is a primary object of the present invention to provide a theft detection and deterrent system which is not subject to the foregoing disadvantages.

It is another object of the present invention to provide a theft detection and deterrent system which permits a stolen vehicle to be traced and located.

It is a further object of the present invention to provide a theft detection system which is readily installed in a vehicle by retrofitting.

It is still another object of the present invention to provide a theft detection and deterrent system which is reliable in operation and which is relatively inexpensive to implement.

DESCRIPTION OF THE INVENTION

The invention will be explained in conjunction with the drawing in which FIG. 1 illustrates a preferred embodiment of a vehicle location system. Reference numeral 10 designates a transmitting station which is preferably centrally located in the geographic area served by the vehicle location system, or at least stationed at a location where it can broadcast to all parts of the supervised area. A transmitter 12 is adapted to broadcast a call signal by way of an antenna 13 connected thereto. An encoder 14 is connected to transmitter 12 and is adapted to modulate the call signal with a selected one of a plurality of predetermined codes, each characteristic of a different one of the vehicles which are protected by the system of the present invention.

Reference numeral 16 designates an exemplary vehicle of the type protected by the system which forms the subject matter of the present invention. Only the parts pertinent to the present invention are shown in the drawing and they include the vehicle battery circuit 18 and a transponder designated by the reference numeral 20. The transponder comprises an antenna 22 and a receiver 24 coupled thereto, adapted to receive the call signal broadcast by antenna 13. A decoder 26 is coupled to receiver 24 and has its output connected to a relay 28. A transmitter 30 is connected for actuation by relay 28. An antenna 32 is coupled to transmitter 30 and is adapted to broadcast a continuous locator signal.

In accordance with the present invention, at least one and preferably a plurality of locator stations 34 are provided, each including an antenna 36 and a location indicator 38. The latter may comprise a proximity detector, e.g. of the type that provides a visual or an audible alarm when the strength of the locator signal exceeds a predetermined level. Alternatively, in a preferred embodiment of the invention, location indicator 38 may comprise a radio direction finder of the type which indicates the direction of the source of the locator signal. Thus, where a plurality of locator stations are used, triangulation may be employed to indicate the location of the missing vehicle in the geographic area served by the system. Stations 34 may be placed at fixed locations such as turnpike toll booths, or they may be carried by driver-operated finder vehicles which can approach the missing vehicle in accordance with the direction indication provided by unit 38. If desired, the radio direction finder may be combined with a proximity detector to provide the advantages of both types of indication.

In accordance with the principles of the present invention, each vehicle protected by the system is assigned a predetermined code which is available for broadcasting at station 10. Such a code may be carried in a centralized computer file available to the operator of station 10, e.g. the police authority serving the geographic area protected. Alternatively, the driver of the protected vehicle may provide the police with the code of the missing vehicle at the time of reporting the theft. In either case, the code corresponding to the missing vehicle is used by encoder 14 to modulate the call signal broadcast by transmitter 12 and antenna 13 to all parts of the geographic area served by the system.

If the missing vehicle is within range of transmitter station 10, transponder 20 will respond to the call signal by broadcasting a continuous locator signal. Specifically, the modulated call signal picked up by antenna 22 is amplified by receiver 24 and is decoded by unit 26. If the decoder recognizes the characteristic code, a responsive output signal is applied to relay 28. The relay in turn actuates transmitter 30 which then broadcasts the locator signal in cooperation with antenna 32.

If the locator signal is picked up by an antenna 36 of one or more of the locator stations, the direction of the missing vehicle with respect to station 34 and/or its nearness to the latter can be established by means of location indicator 38, as discussed above.

The successful operation of the system which forms the subject matter of the present invention is critically dependent on the time period within which the theft is detected and within which station 10 goes into operation to broadcast the code of the missing vehicle. Clearly, if too much time elapses, the stolen vehicle may be driven into a building wherein the surrounding metal structure renders antennas 22 and 32 ineffective. However, in many instances of vehicle theft, particularly truck highjackings, the time interval is sufficient to obtain an effective police response, provided the communication link is not interrupted. To avoid such interruptions, transponder 20 is preferably concealed on the vehicle, e.g. beneath the roof or within a hollow structural member such that, even if the transponder has been located, access to it is difficult and time-consuming. As a further safety measure, more than one transponder may be secreted in different parts of a vehicle, or in different sections of a trailer truck. Since a portion of the metal structure of the vehicle may be made to serve the function of the receiving and the broadcasting antennas, the system may be made independent of the requirement of a separate radio antenna, thus further insuring the system's reliability and making it more difficult to render it inoperative.

As a further precaution the transponder power supply preferably is concealed. This may be done by hiding a self-contained battery in an inaccessible location on the vehicle. Since the power requirements of the transponder can be relatively small if an integrated circuit construction is used, the battery may also be small and therefore readily concealed. Alternatively, the transponder may be connected to the vehicle battery circuit, preferably at a number of points so that interruption at one point will not disable the transponder. As a further safety measure, the transponder may operate from a rechargeable battery which is connected to the vehicle battery circuit at a number of points. In the latter case, if the trailer of a highjacked truck is disconnected from the cab and hence from the cab's battery circuit, the transponder will continue to operate on the power supplied by the rechargeable battery.

Locator stations 34 may be placed at strategic points along major traffic areas, e.g. in the toll stations of a turnpike. However, in a preferred embodiment of the invention stations 34 are carried by finder vehicles, e.g. by police cars, each equipped with a radio direction finder and/or a proximity detector.

The invention which forms the subject matter of this application can be readily implemented with state-of-the-art devices. Thus, readily available police transmitter stations, e.g. of the type which are presently located along a turnpike or at other points in the geographic area served by the system, may serve as transmitting station 10 to broadcast the call signal. Encoder 14 may likewise be implemented with state-of-the-art techniques. For example, a touch-tone telephone may be used to modulate the call signal with the desired code.

Transponder 20 may take the form of various commercially available units of this type of circuit, for example, as shown on page 80 of "Sourcebook of Electronic Circuits" by John Markus, Copyright 1968 by McGraw-Hill Inc. Such circuits may be miniaturized with state-of-the-art solid state techniques.

Locations indicator 38 may constitute a radio direction finder and/or proximity indicator of the type which are in common use in police work, in military applications and in nautical applications. Examples of such circuits are found on page 498 and 132 respectively of the aforesaid "Sourcebook of Electronic Circuits." Here again, state-of-the-art solid state circuitry is available to minaturize such equipment. Thus, one of the salient advantages of the present invention, particularly where stolen vehicles are concerned, is the adaptability of the invention for use with presently available police broadcasting apparatus and state-of-the-art circuitry.

The present invention is not limited to the detection of stolen vehicles, but may be employed to locate quickly specific vehicles in a large fleet of such vehicles. For example, a specific car in a large motor pool or in a fleet or rental cars may be located in this matter, or the location of a specific freight car in a railroad yard may be determined by the use of the present invention. Further, the invention is not limited to vehicles as such, but may be used to find any object, or even an animal, the location of which needs to be ascertained at various times. For example, it may be desirable on a large production line to trace the progress of articles in the process of manufacture, by keeping track of designated ones of such articles. Since the transponder can be made relatively compact, its attachment to the designated articles on the production line need not present a problem. In such a system, proximity detectors stationed along the production line provide an indication of the location of the designated objects.

From the foregoing discussion, it will be obvious that numerous modifications, substitutions and equivalents will now occur to those skilled in the art, all of which fall within the spirit and scope contemplated by the invention. Accordingly, it is intended that the invention be limited only by the scope of the appended claims:

What is claimed is:

1. A system for locating a selected motor vehicle in a circumscribed geographic area, said selected vehicle being one of a multitude of motor vehicles dispersed randomly throughout said area with each vehicle having a different predetermined vehicle identification code assigned thereto; said system comprising:

a first transmitter centrally stationed in said geographic area and adapted to broadcast a call signal, encoding means coupled to said first transmitter for modulating said call signal with any selected one of said different codes;

each of said motor vehicles including at least one transponder inaccessibly concealed thereon, said transponder including a first receiver, a second transmitter adapted to broadcast a continuous predetermined locator signal, a decoder coupled to said first receiver adapted to provide an output signal in response to said call signal when said call signal is modulated with the vehicle identification code characteristic of the vehicle on which the transponder is concealed, and a relay coupled between said decoder and said second transmitter adapted to actuate the latter in response to said output signal;

at least some of said transponders on different vehicles being adapted to broadcast identical locator signals;

at least one finder vehicle of transportation adapted to be driver-operated;

a second receiver mounted on said finder vehicle of transportation; and a direction finder on said finder vehicle of transportation responsive to said locator signal picked up by said second receiver to indicate the direction of the source of said locator signal relative to said further vehicle of transportation.

2. A system for indicating the proximity of a stolen vehicle comprising:

at least one first transmitter means adapted to broadcast a call signal modulated with any selected one of a plurality of vehicle identification codes each assigned to a different one of a multitude of vehicles including said stolen vehicle;

a transceiver affixed to said stolen vehicle, said transceiver including first receiver means for receiving said call signal, second transmitter means adapted to broadcast a continuous locator signal, and circuit means coupled between said first receiver means and said second transmitter means for activating said second transmitter means only upon reception by said first receiver means of said call signal modulated with said vehicle identification code assigned to said stolen vehicle;

a plurality of second receiver means each adapted to receive and respond to said locator signal, said second receiver means being remote from said first transmitter means and separate from said stolen vehicle; and means responsive to said second receiver means for providing an indication of at least the bearing or distance of said stolen vehicle relative to said second receiver.

3. A system according to claim 2 comprising a plurality of said transceivers each affixed to one of said plurality of vehicles, with at least some of said transceivers on different vehicles being adapted to broadcast identical locator signals.

4. A system according to claim 3 wherein said first transmitter means is adapted to broadcast a multidirectional call signal.

5. A system according to claim 4 wherein said identical locator signals are multi-directional.

6. A system for locating a selected one of a multitude of vehicles of transportation where said vehicles are dispered randomly throughout a wide area and where at least some of said vehicles are in motion, comprising:

a plurality of widely separated first transmitter means each adapted to broadcast a call signal;

selectively operable means coupled to each of said first transmitter means for modulating said call signal with any one of a large plurality of predetermined vehicle identification codes each characteristic of a different one of said vehicles including said selected vehicle;

a plurality of transponders each affixed to a different vehicle of said multitude of vehicles including said selected vehicle, each of said transponders including (a) first receiver means, (b) second transmitter means adapted to broadcast a continuous locator signal, and (c) circuit means coupled between said first receiver means and said second transmitter means for activating said second transmitter means only upon reception by said first receiver means of said call signal modulated with the vehicle identification code characteristic of the vehicle to which said each transponder is affixed; and a plurality of mobile locator stations separate from said vehicles and said first transmitter, each of said locator stations comprising second receiver means adapted to receive said locator signal and location indicator means responsive to said second receiver means for providing in relation to the locator station an indication of at least the bearing or presence of a vehicle having a transponder broadcasting said locator signal.

7. A system in accordance with claim 6 wherein said means for modulating said call signal comprises a selectively operable signal encoding means adapted to selectively generate encoded signals corresponding to any one of said vehicle identification codes.

8. A system in accordance with claim 6 wherein said means for modulating said call signal comprises a touch-tone encoder.

9. A system in accordance with claim 6 wherein said circuit means of each transponder includes decoder means for providing an output signal only in response to a code characteristic of the vehicle to which the transponder is affixed, and relay means for activating the second transmitter means in response to the output signal of said decoder means.

10. A system in accordance with claim 9 wherein said vehicle locator stations are mounted on self-propelled motor vehicles capable of being driven to the location of a vehicle having a transponder broadcasting said locator signal.

11. A system in accordance with claim 10 further including at least one stationary locator station which also comprises a second receiver means and a location indicator means responsive to said second receiver means.

12. A system in accordance with claim 10 wherein said first transmitter means is stationary and is adapted to broadcast a multi-directional call signal.

13. A system in accordance with claim 10 wherein said vehicles of transportation are motor vehicles.

14. A system in accordance with claim 13 wherein said transponders are inaccessibly concealed on said vehicles.

15. A system in accordance with claim 13 wherein each vehicle to which a transponder is affixed includes means for applying power to said transponders, said power-applying means comprising the battery circuit of said vehicle and means inaccessibly concealed on the vehicle for tapping into said battery circuit at least at one location.

16. A system in accordance with claim 15 wherein said means for applying power to said transponder further includes a rechargeable battery inaccessibly concealed on said vehicle.

17. A system in accordance with claim 15 wherein said means for applying power to said transponder comprises a self-contained battery inaccessibly concealed on said vehicle.

18. A system in accordance with claim 15 further including a plurality of said transponders inaccessibly concealed at different points on said selected vehicle.

19. A system in accordance with claim 15 wherein said location indicating means comprises a radio direction finder.

20. A system in accordance with claim 15 wherein said location indicating means comprises a proximity detector.

21. A system in accordance with claim 13 wherein said location indicating means comprises a radio direction finder and/or a proximity detector.

* * * * *